United States Patent [19]

Ett

[11] Patent Number: 5,298,731

[45] Date of Patent: Mar. 29, 1994

[54] METHOD FOR PRINTING AND READING FOR ORTHOGONAL BAR CODE PATTERNS

[75] Inventor: Allen H. Ett, Bethesda, Md.

[73] Assignee: International Business Machines Corporation, N.Y.

[21] Appl. No.: 996,292

[22] Filed: Dec. 23, 1992

[51] Int. Cl.⁵ ............................................. G06K 19/06
[52] U.S. Cl. .................................... 235/494; 235/462; 283/70; 283/74
[58] Field of Search ............... 235/462, 494, 463, 466; 283/70, 74

[56] References Cited

U.S. PATENT DOCUMENTS 4,263,504 4/1981 Thomas .............................. 235/494

*Primary Examiner*—Donald Hajec
*Assistant Examiner*—Adrian Young
*Attorney, Agent, or Firm*—John E. Hoel

[57] ABSTRACT

A data processing system, and method combine two alphanumeric data streams into a single bar code representation. Storing a first conversion table converts a first sequence of alphanumeric characters into a corresponding sequence of first bar code characters having character widths modulated in a first direction. A second conversion table converts a second sequence of alphanumeric characters into a corresponding sequence of second bar code characters having character heights modulated in a second direction orthogonal to the first direction. The system outputs a composite bar code sequence to represent both the first and the second sequence of alphanumeric characters.

12 Claims, 10 Drawing Sheets

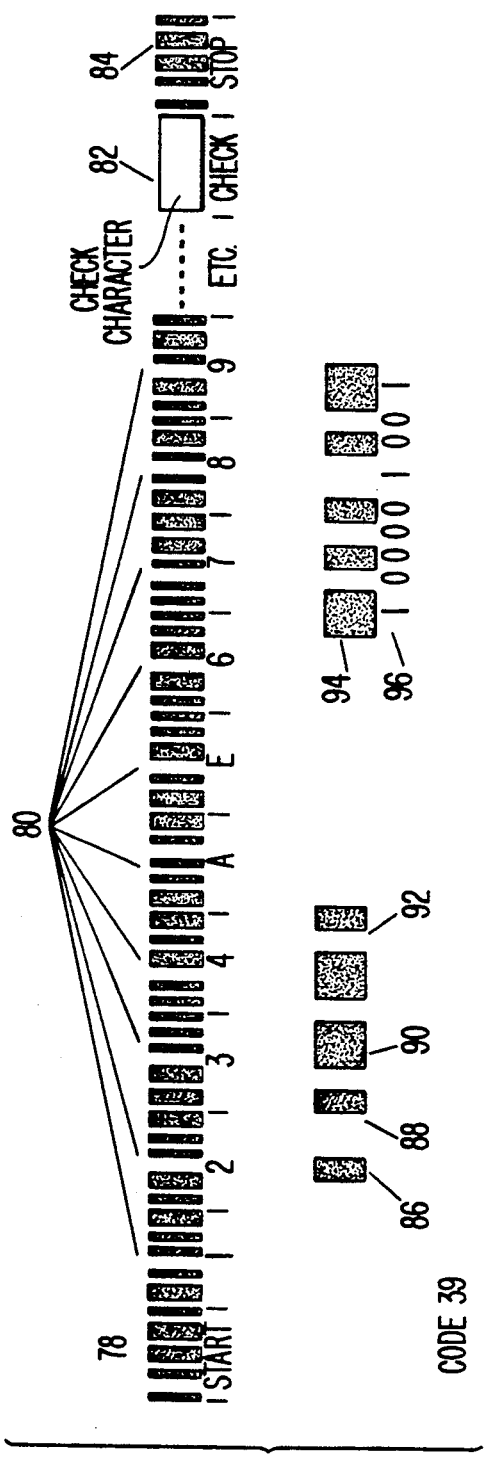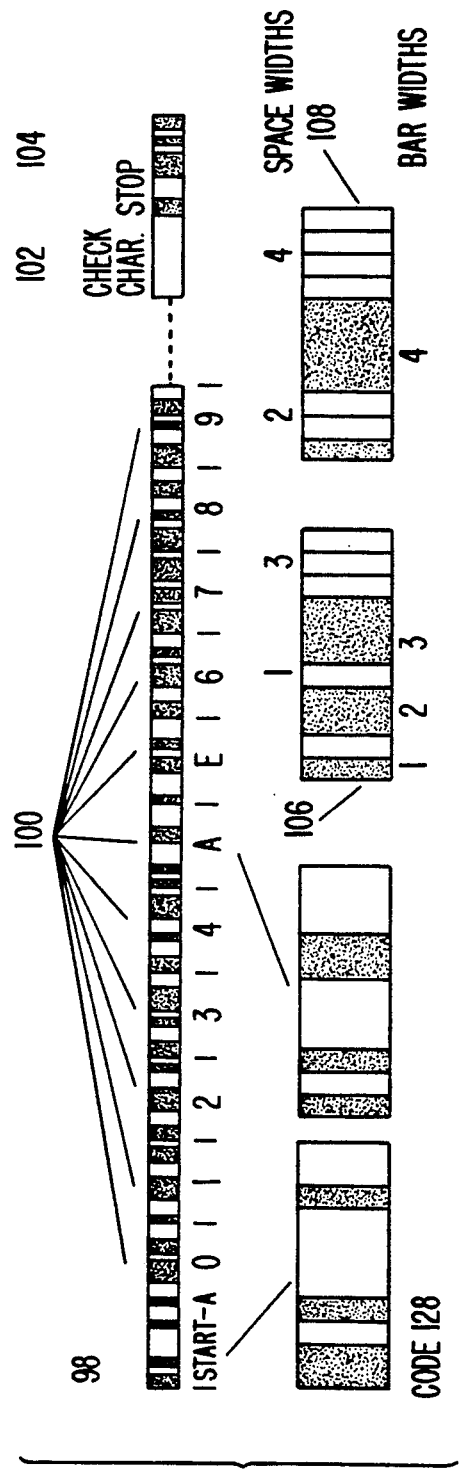

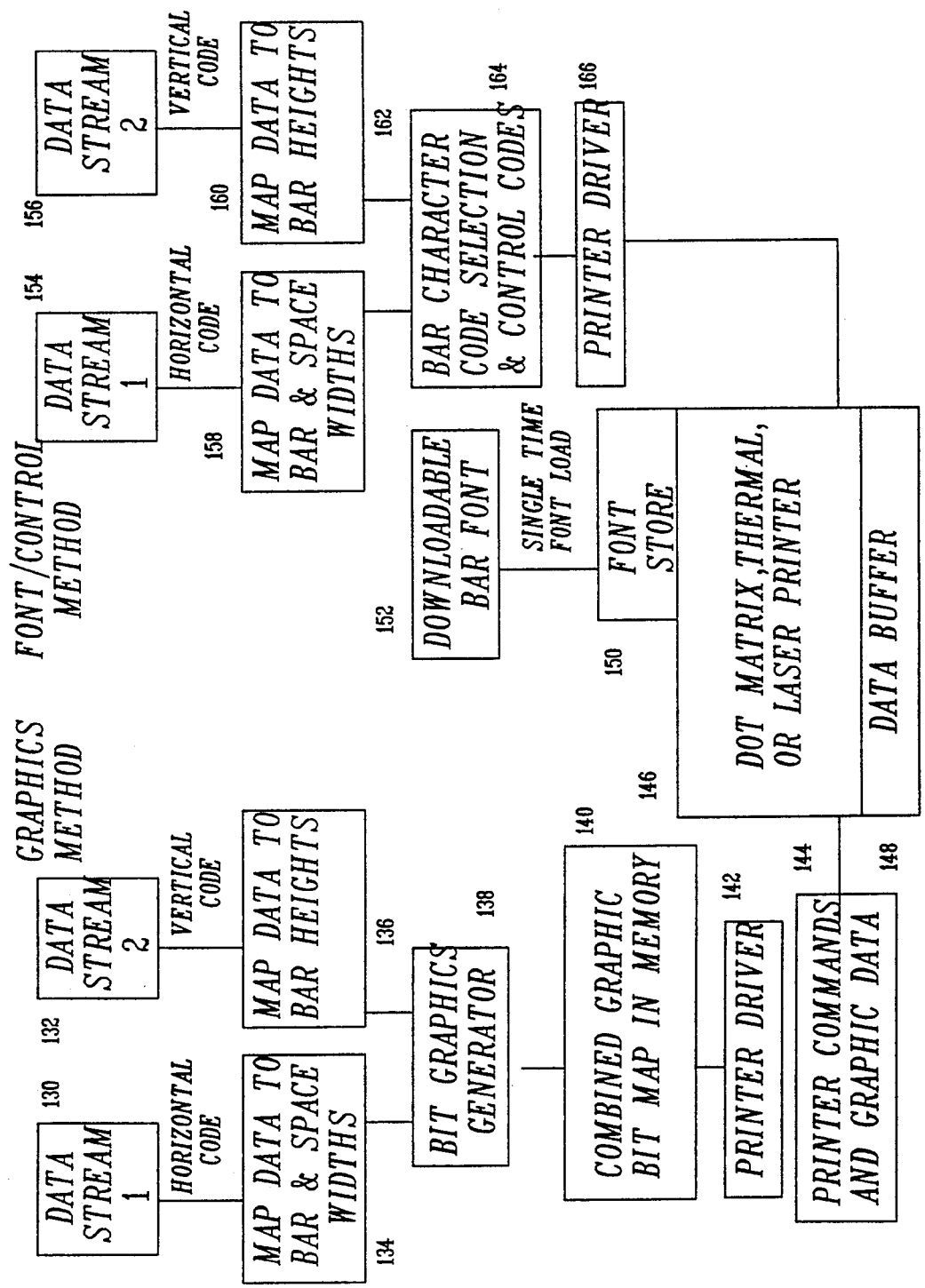

BARS  00110  10001  0 1100 01001  11000  00110
SPACES  1000  0100  0 100  0 100  0 100  1000

HORIZONTAL MODULATED CODE

VERTICAL MODULATED CODE

0011001011101001011010010101010

COMBINED CODE

ALTERNATE COMBINED CODE

3 LEVEL COMBINED CODE

METHOD FOR PRINTING AND READING FOR ORTHOGONAL BAR CODE PATTERNS

BACKGROUND OF THE INVENTION

Bar codes have become a common means for identification of articles, conveying serial numbers, and other relatively short items of data. There are a number of different bar codes in common use, such as; the UPC code found on most packages in grocery stores; the 2 of 5 code, Codabar, Code 39 widely used for non grocery product identification and other applications; Code 93, similar to Code 39 but with the capability of encoding the full ASCII character set. These codes all carry their information in the linear domain along the code pattern. Various means are used to define the ones and zeroes of the binary code patterns. In some cases a narrow bar or space is a zero bit, while a wide bar or space is a one bit. Other combinations of bars and spaces are also used.

Another bar code is also in common usage by the US Postal System. This bar code carries its information in the height of each bar of the bar code, with all marks and spaces of equal width and used only for timing purposes. In this system a short bar is a zero and a tall bar is a one. This is the only commonly used code with vertical modulation.

This invention recognizes that these two methods of coding are orthogonal and that therefore a coding system can be devised which combines these coding approaches to provide either more code characters in the same physical space, or permit the conveyance of the same information in two different methods for greater reliability in code printing/reading. This invention provides a method for incorporating the two code streams into one pattern, and a method for separating these code streams during the reading process.

SUMMARY OF THE INVENTION

It is therefore the object of this invention to convert two streams of digital data in either character or binary form into a combination bar code with orthogonal modulation carrying the information content of the two data streams so that they are separable on reading.

It is another object of this invention to provide a means for printing of this combined bar code on conventional dot matrix, thermal matrix, or laser printers.

It is another object of this invention to provide a coding method which can handle both character based data, and binary data in separable fashion at the same time.

It is another object of this invention to enable the recovery of the two streams of information, both of which may be character based, binary, or a combination of character and binary data, and two separate the coded information into two data streams identical to those used to create the bar code.

It is a further object of this invention to provide the combined bar code in such a fashion as to be readable by existing bar code reading devices capable reading each of the individual codes employed in the pattern.

These objects and others are accomplished by means of a data processing system, or by specially designed single purpose hardware. In both cases the function performed are equivalent. The data processing system or special hardware includes a means for inputting the two data streams to be included in the bar code, or a single input means used sequentially. The data processor converts these input streams to binary representations of character data if required, supplying the two streams to the logic of a bar code generator which produces the required graphics code or control codes for an attached printer to print the desired code pattern. A second set of data processing or specialized hardware is used to read and extract the information from the bar code, separating it into the two original data streams.

In one preferred embodiment the two stations used for printing the bar code patterns, and also for reading the bar code patterns consist of identical data processors, but with different control functions. A single station could also be used to accomplish both the generation of the bar code patterns on an attached printer, and reading the bar code from an attached scanning device.

The data to be incorporated into the bar code may be supplied by an attached keyboard, or by other input devices, including serial and parallel data input devices, magnetic tape, magnetic disk or other peripheral devices. The data is converted into two streams of binary data if required, and supplied to either a graphic generator which produces a graphic image of the combined bar code for transfer to the printer via a device driver, or alternatively may generate a series of escape codes and character codes to permit the printer to print the bars in the prescribed location, width and height by means of a special character set stored in the printer.

In the reading process the bar code is scanned by an attached scanning device, forming a bit graphic image of the bar code pattern. The bar code image can also be extracted from a larger image in an image system based embodiment.

The graphic image is analyzed by a series of instructions in the data processor which for each code bar determines its height and width. The widths of spaces are also determined. The height information is converted into a binary bar code, comprising one of the two data streams. The widths of the bars and spaces are further analyzed by logic to determine the binary representation for the particular width modulated bar code being used. The patterns of ones and zeroes in this element of the code are then converted into character data if required.

The two separated data streams are then provided to perform such other functions as are required by the intended end usage of the system. In the case where the two data streams contain the same data, they can be compared to insure data integrity. The data streams may also be provided as outputs to feed other attached devices, such as printers, displays, cash registers, and the like.

BRIEF DESCRIPTION OF THE DRAWINGS

The above and other objects, features and advantages of the present invention will be better understood with reference to the following figures.

FIGS. 2A-2D illustrate two of the commonly used bar codes which may be used in the practice of this invention, Code 39, and Code 128.

FIG. 4 depicts a flow diagram of the processes used in generation of a combined bar code.

DETAILED DESCRIPTION OF THE DRAWINGS

Figure 1:
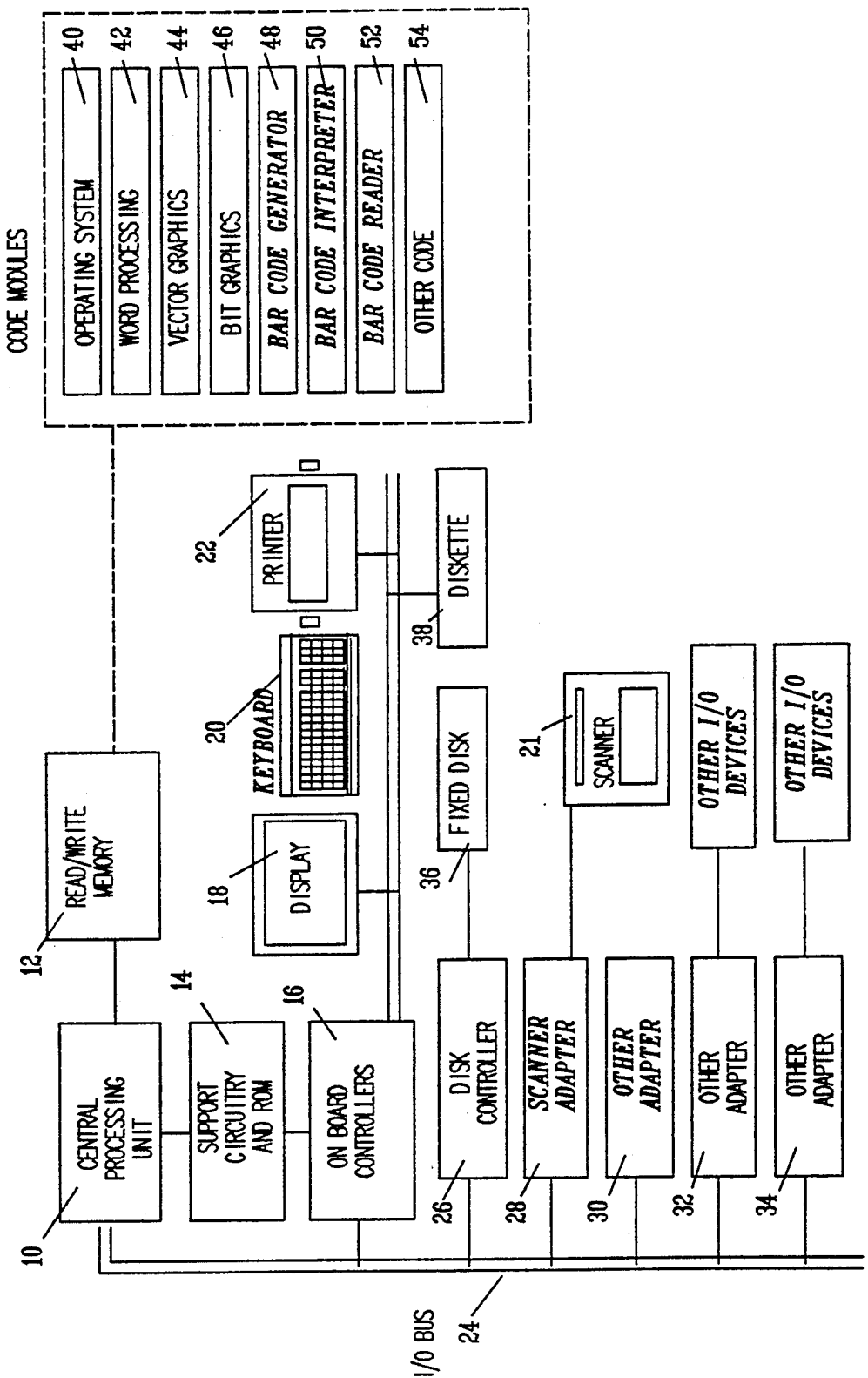
FIG. 1 is an architectural block diagram of a station that can both print and read the combined bar codes.

This invention can be practiced by means of specific hard connected logic elements and storage elements, or can be practiced by means of programming or firmware on a small general purpose computer such as an IBM PC or PS/2. FIG. 1 describes the block diagram of apparatus comprising a small general purpose computer complete with optional display means 18, keyboard means 20, other input means 32, 34, scanning means 21, Printing means 22, and a variety of storage means 12, 36, 38, and code modules 39, which contain the necessary instructions to perform the method of this invention as well as other general tasks.

The Central processing unit 10 provides program controlled logic for executing its instruction set, where the instructions are derived from the Read/Write memory 12. Support circuitry 14 and Read Only Memory (ROM) provide the timing control, Direct Memory Access (DMA) and other support functions for general purpose processing of digital data. The On Board Controllers 16 which are typically found in modern Personal Computers provide the circuitry and in some cases memory and ROM based code. The typical devices supported by the on board controllers include Displays 18, Printers 22, and Diskette storage 38 connected by a system bus 21. Other commonly used peripheral equipment will be supported by on board controllers in the future. These systems also provide an I/O bus 24 which permits the attachment of controllers and adapters not sufficiently common to all applications to be included in the on board set. Typical adapters which may be placed on the I/O bus include a fixed disk controller 26, Scanner Adapters 28, and other adapters 32, 34, which are applicable to the practice of this invention.

An operating system 40 such as DOS, OS/2, or AIX (Unix) is required for the fundamental functioning of the computer, and provides for most common house keeping functions, such as operation of storage, printing, display, etc. A number of other code modules may reside on the system at different or the same times depending on the nature of the operating system. Among the code modules which would be needed in the practice of this invention are the Bar Code Generator code 48, Bar Code Interpreter code 50, and the Bar Code Reading code 52 which are resident in memory 12.

Using a general purpose computer to generate and print the combined Bar codes the code data is entered as character data from a keyboard 20, or from another input device 32, 34 and binary data may be entered by an appropriate binary input channel. The character data is converted into a series of binary codes which represent either the widths of the marks and spaces such as that illustrated in FIGS. 2, 3, 7, and 8 or the height of the bars if the vertical modulation is used for character data. In any event the two inputs which may be either character or binary in nature are converted to the binary sequences necessary for the chosen bar code. One binary stream represents bar widths and space widths, while the other binary stream represents bar heights. These two streams are stored in memory 12 or disk storage 36. The Bit Graphic Code Module 46 or Printer Control code module 48 takes this stored bit data and generates a bit map representing the bar or space in the bar code. If the vertical modulation indicates a logical one then a full height bar is produced of the width required by the horizontal modulation bit, a short bar of this width is generated if the vertical modulation bit is a logical zero. The specific width of the bars or inter-bar spaces is determined by the particular code in use. These Graphic bit maps are stored in Memory until the combined bar code pattern is completed, whereupon it is sent as a graphic bit stream to the printer according to the format required by the printer. The printer produces the combined bar code output in paper form. The operation of the apparatus may be viewed on the optional attached display, where the image of the code pattern may be viewed as it is generated.

The same or a similar general purpose computer 10 can be used to scan the bar code pattern, convert the scanned bit map image into a sequence of bar width, bar height, and inter bar spacing width information. The bar width and inter bar spacing information stored in memory 12 is then analyzed to determine the bar code type, and the actual code sequences based on bar width, bar spacing, and relative bar and spacing widths. The bar height information is separated out and directly provides the binary data or character representation in the vertical modulation. The results of this processing are again stored in memory 12 and used to drive appropriate output devices and/or the display device.

FIG. 2 illustrates two of many applicable bar code systems for the practice of this invention, code 39, and code 128. FIG. 2A shows a typical string of bar codes in code 39, with a start character 78, data characters 80, a check data character 82, and a stop character 84. The start 78 and stop 84 characters are identical and contain information needed to define the widths of the bars and spaces in the ensuing code patterns. In code 39, the first bar in the start/stop pattern is always a narrow black bar 86, and the white space following is a wide white space 88. Measurements of these initial widths provides the necessary information to read the entire code regardless of pattern density. A data character 94 representing the letter A is illustrated with a 3 of 9 binary bit representation of the bar pattern 96 below it. Wide bars/spaces are valued as 1, and narrow bars/spaces as 0. The use of 9 binary bits to represent 44 characters which would normally require only 6 binary bits, provides the open code set needed to permit detection of error character patterns. If code 39 is used and a character has more/less than three wide spaces/marks or more/less than 9 total spaces/marks, it is rejected. Also, if it does not correspond to one of the specified patterns in the code, it is rejected.

FIG. 2B illustrates a typical stream of bar code patterns in Code 128. This pattern is initiated with a start character 98 followed by data characters 100, a check character 102, and a stop character 104. The detailed code patterns for the start character 106 and the character A 108 are shown in the figure and the permitted bar and space widths are illustrated. In code 128, each character is 11 units long, and may contain bars of 1, 2, 3, or 4 units in width. Spaces may similarly be 1, 2, 3, or 4 units in width. This code permits the representation of the full 128 character ASCII set in code 128 bar codes. It, too, is an open code set which provides for error detection. In this code set, 11 bit spaces are used for 7 bits worth of information.

Other bar code structures which might be used in the practice of this invention include, but are not limited to, Code 2 of 5, Code 93, Codabar, and variations of the UPC code.

Figure 3A:
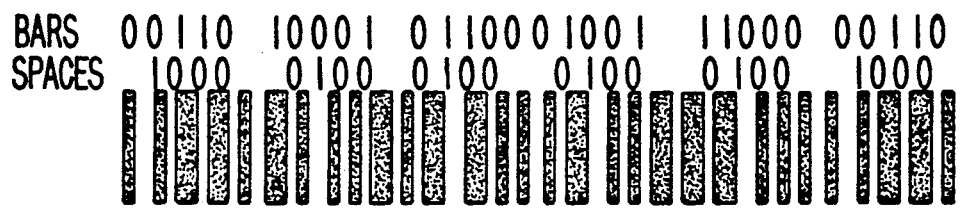
FIG. 3A illustrates a typical bar code pattern in which the information is carried by the widths of bars and spaces, with the interpretation of the bars and spaces comprising the pattern into ones and zeroes. The pattern illustrated is code 39.

FIG. 3A illustrates a typical bar code in the pattern of code 39 representing a set of ASCII characters. The logical representation in the 3 of 9 code for each of the bars and spaces is seen at the top of the pattern.

Figure 3B:
FIG. 3B illustrates a typical USPS Bar/Half Bar code pattern in which the information is carried in the relative heights of the bars. Tall bars represent one bits, and short bars represent zero bits.

FIG. 3B illustrates a typical bar/half bar code pattern with arbitrary content of the type used by the US Postal Service in sorting of preprinted and coded mail. This bar code is a binary data bar code where the tall bars represent logical ones, and the short bars represent logical zeroes. This pattern generally consists of equal width bars and spaces, however this is not essential to the code since the timing is established by the leading edge of each bar.

Figure 3C:
FIG. 3C illustrates the combination of two bar codes which are orthogonal in the means in which data is represented into a single bar code carrying both sets of data in a separable form in a single bar code pattern. The binary representation of the code 39 pattern portion is represented by the rows of figures, the binary representation of the vertical modulation is not separately shown, bus consists of binary one bits for the tall bars and binary zero bits for the short bars

FIG. 3C illustrates the combination of these two bar codes in the practice of this invention. In this case the bars and spaces are of the widths required by the code expressed in horizontal modulation and the bar heights are that required for the vertical modulation. Since the information content is in orthogonal means of modulation the codes do not interact and are clearly separable by the apparatus described.

FIG. 4 illustrates the processes used in the printing of the combined bar orthogonal bar codes. The information to be included in the bar code pattern is provided by the two data streams 130, 132, representing the horizontal code component and vertical code component respectively. Data Stream 1 is converted and mapped to a table in memory of bar and space widths required for the particular horizontal code in use 134, while data stream 2 is mapped to a table of bar heights in memory 136. The data from these tables is fed to the bit graphics generator 138 which creates a bit map of each required bar and space, with the bar height being determined by its table. The bar image and space image bit maps are stored contiguously in memory as a graphic bit map of the entire combined bar code pattern 140. The graphic bit map is stored in the format of the attached printer, and is fed through the printer driver 142 along with required printer commands and escape codes provided to the driver 144 to a suitable all points addressable printer such as an Ink Jet Printer, Laser Printer, Thermal Transfer Printer, or Dot Matrix Printer. The quality level of the resultant printed bar code is determined by the choice of printer 146. The printer normally stores this information in its buffer memory 148 until the complete image is present.

An alternate method of printing the combined bar code pattern is illustrated on the right side of the figure. This method is applicable to graphic printers which include a downloadable font capability and control of the printing location. This method is the same as the other method for the first few steps which create the horizontal and vertical data tables 158, 159, which are passed to the Bar Character Code selection logic 164 which outputs codes corresponding to the printer code table for the appropriate bar code characters to the Printer Driver 166 and from the driver to the Printer 146, with the required control codes for positioning. The bar code font set 152 consists at a minimum of a tall bar and a short bar in each of the widths required by the supported bar codes and blank character spaces in each of the spacings required for the supported bar codes. The Downloadable Bar Font Set is downloaded to the printer Font Storage area 150 at startup, and can be combined with other glyphs or Alphanumeric characters to form a multi-purpose font. In practice of this method of the invention the selected bar code characters are printed contiguously to form the bar code patterns such as are illustrated in FIG. 3C.

Figure 5:
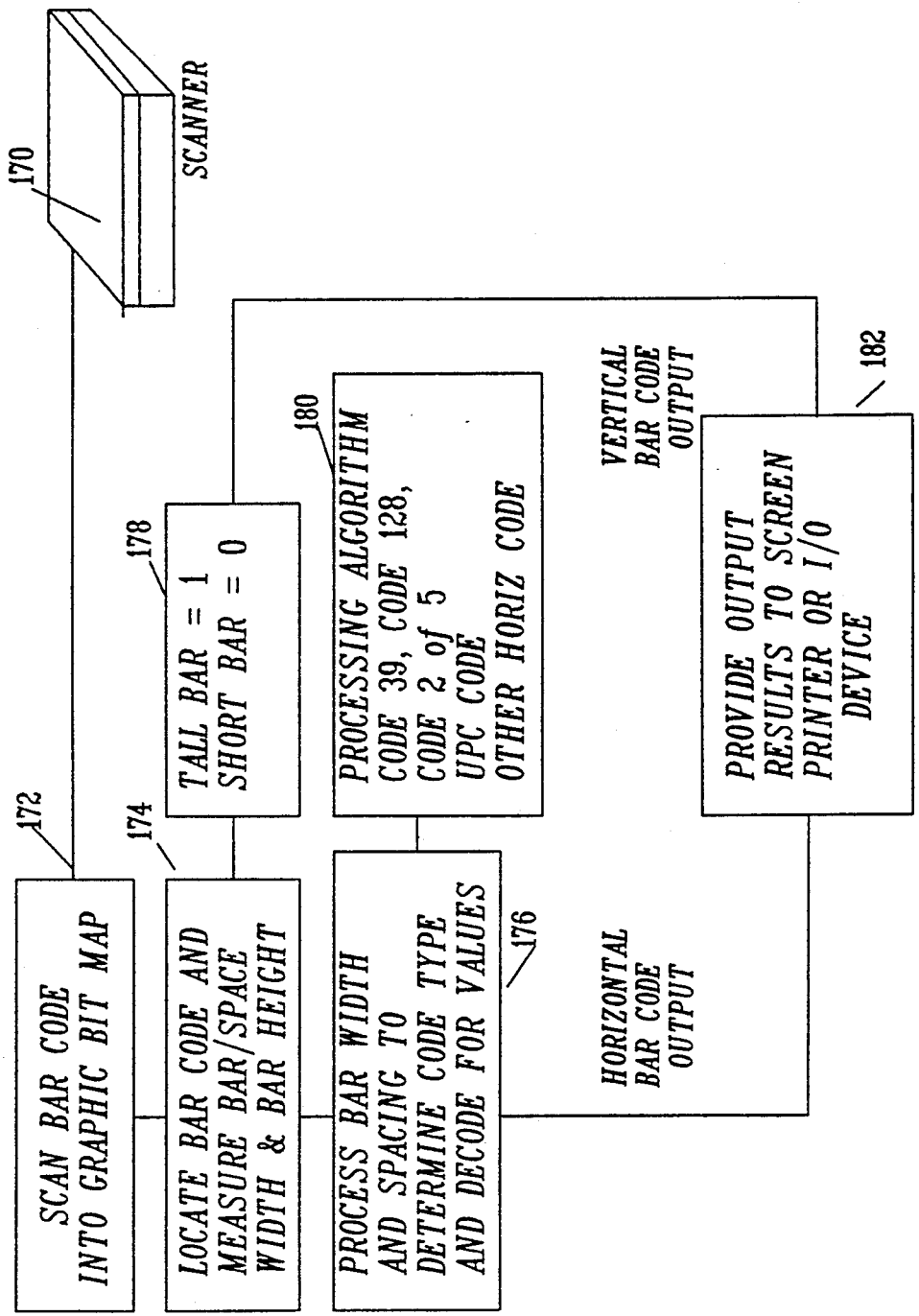
FIG. 5 depicts a flow diagram of the processes used in reading and separating the combined bar code pattern.

FIG. 5 illustrates the processes used in the reading of the combined bar code and separating it into its two components. The combined bar code to be read and interpreted is scanned by means of a suitable scanner 170, creating a graphic bit map of the area covered by the bar code pattern 172. The bar code is located within the bit map by means of the unique characteristics of bar patterns, and the bar heights, widths and spacings are measured and stored in a table in memory 174, The bar height table directly provides the vertical code component with a tall bar being a logical one, and a short bar a logical zero 178. The horizontal data table is processed to determine the code type being used in the horizontal domain 176, and then is processed through the bar code algorithm to complete the code reading process. The processing algorithms are well known in the art for the cited horizontal bar codes, and utilize the absolute bar widths and spaces combined in some cases with relative width of adjacent bars and spaces to decode the pattern. FIG. 3A illustrated the Code 39 pattern with the bit values of each of the bars and spaces in the code. The logic also determines the output character from the combination of bit values by comparison with a data table. The decoded bar code information is provided for display on a screen or to an appropriate I/O device for transfer or control purposes 182.

Figure 6:
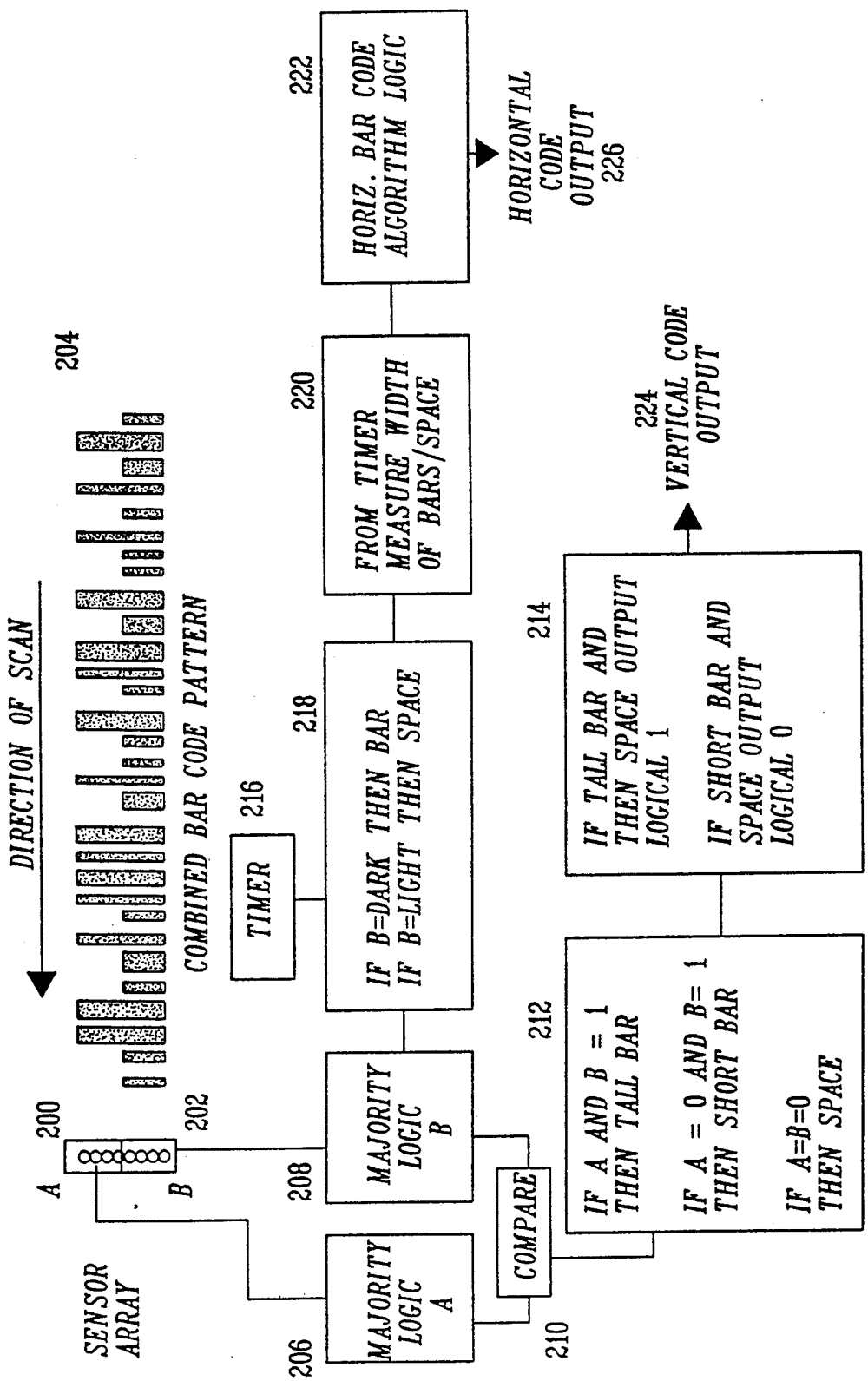
FIG. 6 depicts the processing details which are applicable to a large raster scan system as well as to the simplified system based on fixed logic illustrated.

FIG. 6 illustrates and describes the method used for separation and reading of the two bar code components, and illustrates a simplified method for bar codes where the registration is constrained. A typical combined bar code such as used in the practice of this invention 204, is passed by a scanning array separated logically into two halves, the upper or A half 200, and the lower or B half 202. The outputs of the individual sensors are processed by majority logic elements 206, and 208. The outputs of these modules are compared 210 and the results processed in the decision trees 212 and 214 to produce the vertical code component output 224. Majority logic B 208 provides a further output to modules 218 and 220, which in combination with the timer provide measurements of each bar and space width. The bar and space width information is applied to the appropriate horizontal bar code algorithm decoder for the code being used in the practice of this invention 222 which in turn provides the horizontal output 226. All of these functions can be directly implemented in hard wired logic, including automatic detection of the code type being used. This is usually accomplished by the particular combinations of bar and space widths in unique patters representing start and stop characters. Individual data characters are also represented by unique combinations of bar and space widths.

Figure 7:
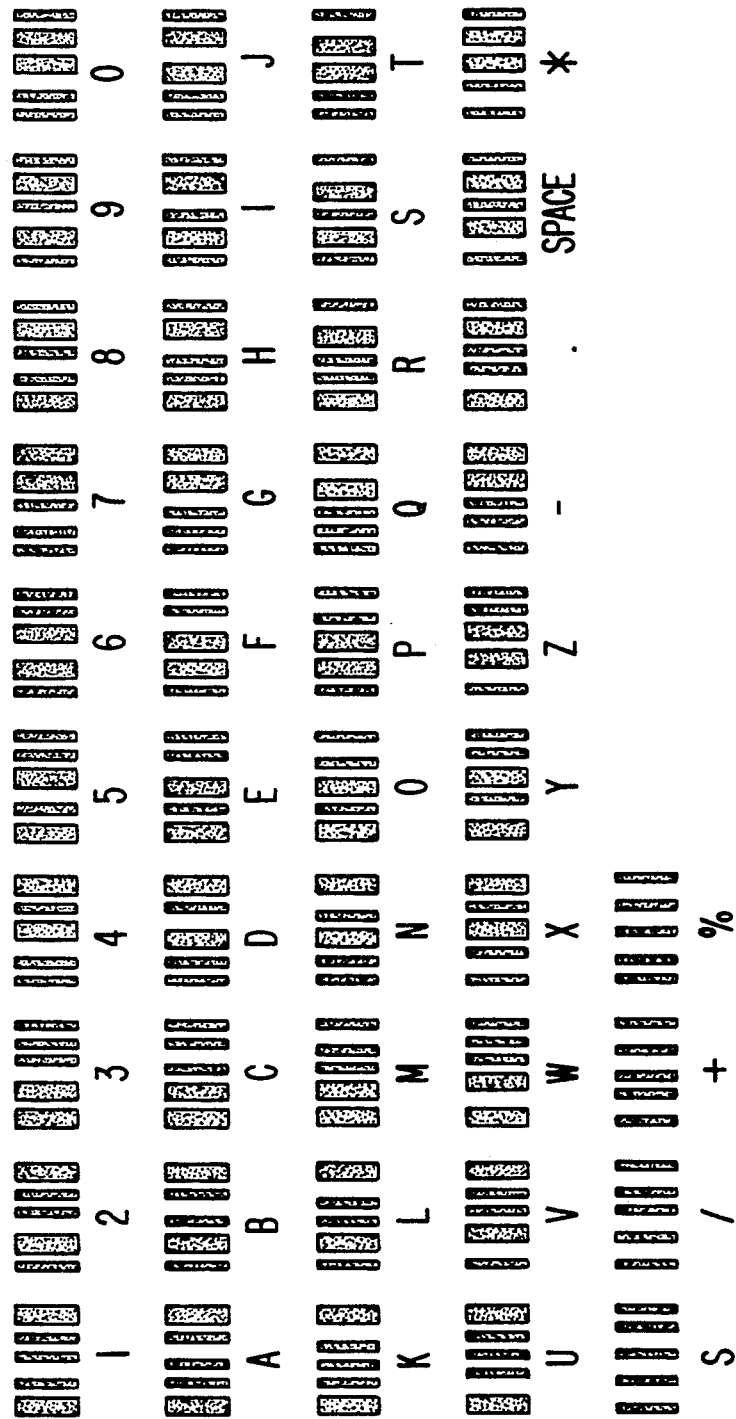
FIG. 7 is a complete set of code 39 bar code patterns.

FIG. 7 illustrates the full character set of the Code 39 bar code, one of the more popular horizontally modulated bar codes which are applicable in the practice of this invention, showing the unique code patterns used for each of the supported data characters, including the asterisk which is used in this code as both the stop and start character.

Figure 8:
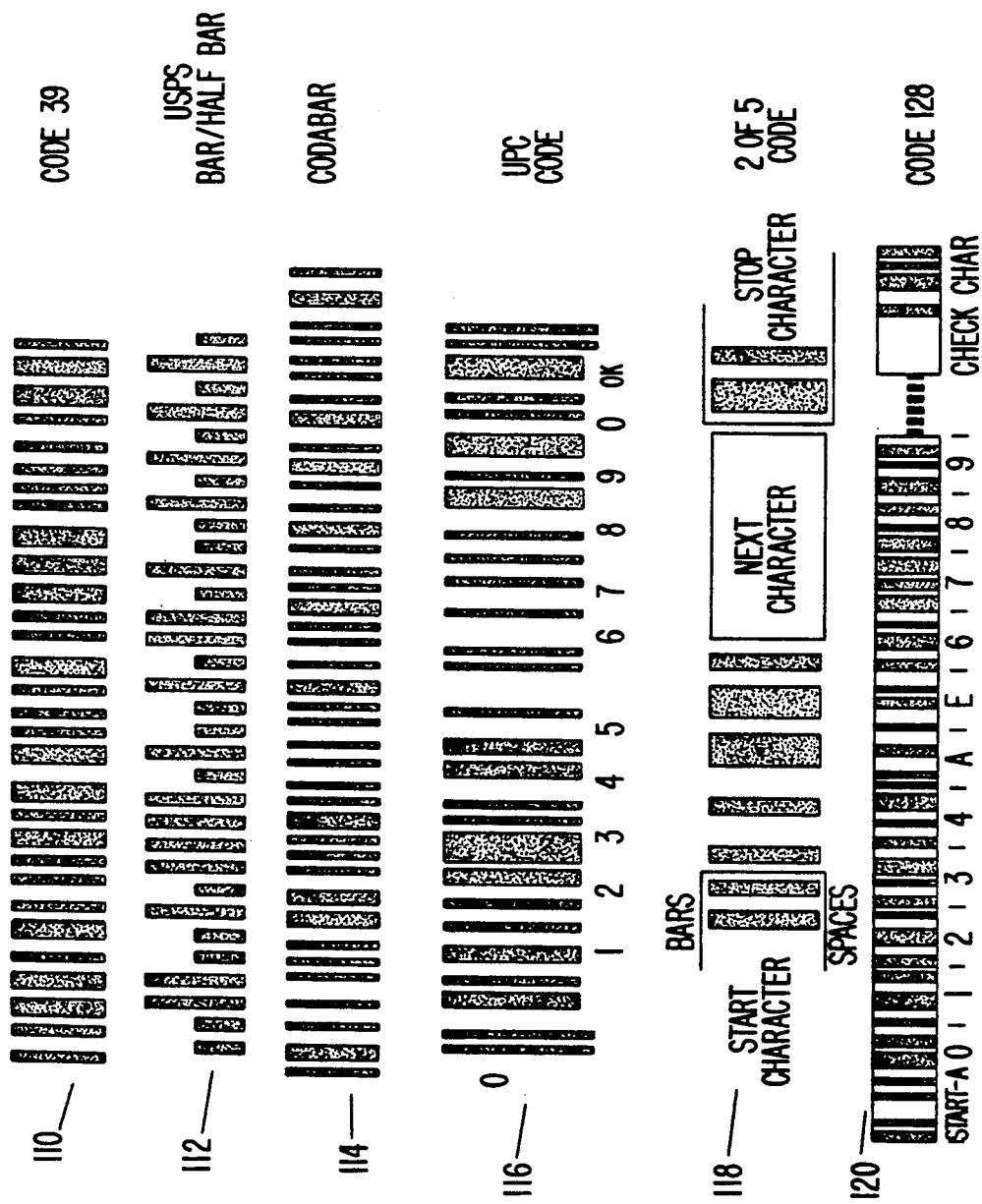
FIG. 8 illustrates samples of all common Bar codes.

FIG. 8 illustrates most of the horizontal or width modulation bar codes which are applicable for the practice of this invention, Code 39 110, the USPS Bar/Half Bar code 112, Codabar 114, the Numeric only UPC code 116, the 2 of 5 code which carries two numeric digits in each pattern, one represented by the bars and the other by the spaces 118, and Code 128 which permits the full 128 character ASCII code set 120.

Figure 9:
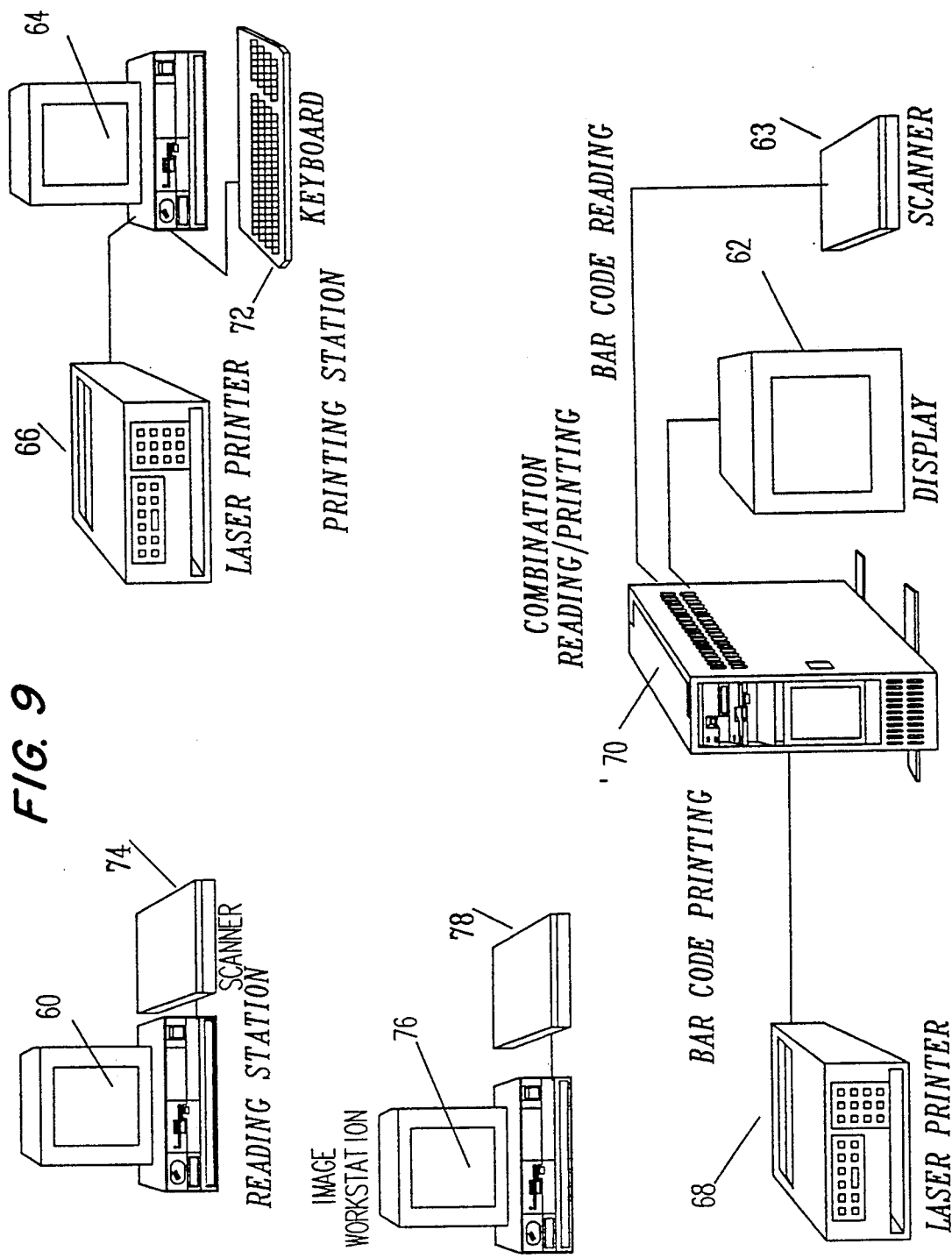
FIG. 9 illustrates various configurations of general purpose computer equipment which can be utilized in the practice of this invention including: a configuration for printing bar codes, a configuration for reading bar codes, a configuration for both reading and printing bar codes, and an image system which can practice this invention by electronically incorporating the combined bar code images in existing or new image documents, and extracting and interpreting the combined bar codes in existing bar coded images.

FIG. 9 illustrates the configurations of a General Purpose computer such as the IBM PC or PS/2 in the practice of this invention, including; a suitable configuration for printing bar codes, a configuration for reading bar codes, a configuration for combined printing and reading, and an Image System which can practice this invention by electronically adding an image of the combined bar code into existing image documents, and by the location and extraction of the combined bar code from image documents.

Figures 10A, 10B, 10C, 10D, 10E:
FIGS. 10A-10E illustrate various alternate forms of the combined code which can be both printed and read by the methods and apparatus used in practicing this invention.

FIG. 10A illustrates the independent horizontally modulated and FIG. 10B illustrates vertically modulated bar codes along with several variations of combined bar codes. These variations include but are not limited to FIG. 10C, a pattern with the vertical information at the top, FIG. 10D another pattern with the vertical information at the bottom, and FIG. 10E another variation which with the addition of a third data stream and determination of up/down position could be used to carry three independent codes in the same physical space without interaction.

While the invention has been described with respect to several illustrative examples, it would be understood by those skilled in the art that modifications may be made without parting from the spirit and the scope of the present invention. For example, the examples shown are primarily concerned with the printing and reading of orthoganally modulated bar codes on and from paper documents. There is nothing to prevent the use of the present invention totally within a dedicated image system, for example generating and electronically adding the bar code patterns to images in electronic bit map form for purposes such as inseparably combining indexing information with the images when the resultant image is stored. Other means of both generating the combined orthogonal bar code and reading it would occur to those skilled in the art. The embodiments presented above are for the purposes of example only and are not to be taken to limit the scope of the appended claims.

What is claimed is:

1. In a data processing system, a method for combining two alphanumeric data streams into a single bar code representation, comprising the steps of:
    storing a first conversion table in said data processing system, for converting a sequence of alphanumeric characters in an alphanumeric character data stream into a corresponding sequence of first bar code characters having character widths modulated in a first direction along said sequence of bar code characters;
    storing a second conversion table in said data processing system, for converting a sequence of alphanumeric characters in an alphanumeric character data stream into a corresponding sequence of second bar code characters in said first direction having character heights modulated in a second direction orthogonal to said first direction;
    inputting a first alphanumeric character data stream and a second alphanumeric character data stream into said data processing system;
    converting said first alphanumeric character data stream in said data processing system using said first conversion table, into a first sequence of first bar code characters having character widths modulated along said first direction;
    converting said second alphanumeric character data stream in said data processing system using said second conversion table, into a second sequence of second bar code characters having character heights modulated along said second direction;
    adjusting the height in said second direction, of selected ones of said first barcode characters in said first sequence, using the height in said second direction of each of said second characters in said second sequence, to produce a composite barcode sequence;
    outputting said composite barcode sequence from said data processing system, to represent both said first and said second alphanumeric character data stream.

2. The method of claim 1, which further comprises:
    inputting into a second data processing system, said composite barcode sequence from said first said data processing system;
    reading said character widths of said composite barcode sequence to produce a first modulated signal in said second data processing system;
    converting said first modulated signal into a reproduction of said first alphanumeric character data stream in said second data processing system;
    reading said character heights of said composite barcode sequence to produce a second modulated signal in said second data processing system;
    converting said second modulated signal into a reproduction of said second alphanumeric character data stream in said second data processing system.

3. A data processing system for combining two alphanumeric data streams into a single bar code representation, comprising:
    storage means for storing a first conversion table in said data processing system, for converting a sequence of alphanumeric characters in an alphanumeric character data stream into a corresponding sequence of first bar code characters having character widths modulated in a first direction along said sequence of bar code characters;

said storage means storing a second conversion table in said data processing system, for converting a sequence of alphanumeric characters in an alphanumeric character data stream into a corresponding sequence of second bar code characters in said first direction having character heights modulated in a second direction orthogonal to said first direction;

input means for inputting a first alphanumeric character data stream and a second alphanumeric character data stream into said data processing system;

converting means coupled to said storage means and said input means, for converting said first alphanumeric character data stream in said data processing system using said first conversion table, into a first sequence of first bar code characters having character widths modulated along said first direction;

said converting means converting said second alphanumeric character data stream in said data processing system using said second conversion table, into a second sequence of second bar code characters having character heights modulated along said second direction;

adjusting means coupled to said converting means, for adjusting the height in said second direction, of selected ones of said first barcode characters in said first sequence, using the height in said second direction of each of said second characters in said second sequence, to produce a composite barcode sequence;

output means coupled to said adjusting means, for outputting said composite barcode sequence from said data processing system, to represent both said first and said second alphanumeric character data stream.

4. The apparatus of claim 3, which further comprises:

second input means for inputting into a second data processing system, said composite barcode sequence from said first said data processing system;

reading means coupled to said second input means, for reading said character widths of said composite barcode sequence to produce a first modulated signal in said second data processing system;

second converting means coupled to said reading means, for converting said first modulated signal into a reproduction of said first alphanumeric character data stream in said second data processing system;

said reading means reading said character heights of said composite barcode sequence to produce a second modulated signal in said second data processing system;

said second converting means converting said second modulated signal into a reproduction of said second alphanumeric character data stream in said second data processing system.

5. In a data processing system a method of combining two individual data streams into a single combined bar code where the information is carried by orthogonal means of modulation, which permits the separation of the two elements of modulation into two separate data streams during the reading process without interaction, comprising the steps of:

inputting two separate data streams of Alphanumeric data, or Binary data at a first or printing station;

storing at said first station, a translation table which is addressable by said character data stream, said table storing a binary bit representation of said bar code character image corresponding to said alphanumeric character;

modifying said binary bit representation, to change the bar heights according to a second translation table, or directly from binary input, such that a logical 1 produces a full height bar, and a logical zero a half height bar;

storing the modified bit map images of said bar code characters in a bit map image comprised of all previous characters, until all input characters have been processed;

transmitting said bit map image together with appropriate control codes to a printer driver means;

transferring the bit map image of said plurality of character bar code images to an all points addressable printing means in its particular graphics printing format;

producing a bar code image comprising a horizontal component and a vertical component where the horizontal component contains the bit map image of the first data input stream and the vertical component contains the bit map image in the height of the bars corresponding to the data in the first input stream.

6. The method of claim 5 which further comprises the steps of;

merging the said stored bar code bit map into an electronic bit map representation of a document image so as to code the image and any later stored copies of the image with identification information in machine readable form.

7. In a data processing system a method of combining two individual data streams into a single combined bar code where the information is carried by orthogonal means of modulation, which permits the separation of the two elements of modulation into two separate data streams during the reading process without interaction, comprising the steps of:

inputting two separate data streams of Alphanumeric data, or Binary data at a first or printing station;

storing at said first station, a translation table which is addressable by said character data stream, said table storing a binary representation of the bar patterns and space patterns of said alphanumeric characters from said character data stream;

storing at said first station, a table containing a bit map representation of each possible code bar and space in both full and half height corresponding to matrix selection codes from a font set;

storing at said first station a translation table containing the character codes in a matrix format addressable by the said binary representation of the bar patterns and by the binary representation of the second said data stream;

said table outputting a series of code matrix position codes corresponding to the code matrix position of the said font set;

downloading said font table containing the said bar and space bit map images to a printing means capable of executing downloaded type fonts;

transmitting said code matrix position codes to a printer driver module;

the said printer driver module controlling the transfer of the font character selection codes to said printing means;

the said printing means consisting of an all points addressable printer producing a paper copy of the combined bar code patterns.

8. In a data processing system a method of reading a bar code consisting of two components corresponding to two individual bar code patterns combined into a single bar code where the information is carried by orthogonal means of modulation, which permits the separation of the two elements of modulation into two separate data streams during the reading process without interaction, comprising the steps of:

scanning the said bar code pattern, converting said pattern into a bit image representation of said pattern;

locating the said bar code pattern within the scanned bit map image;

processing said bit map image to measure the widths and height of all code bars within said pattern and the width of all inter-bar spaces;

storing a first conversion table addressable by the resulting bar widths and space widths wherein is also stored the character codes corresponding to each pattern of bar and space width;

storing a second conversion table addressable by the said bar height information containing output codes for various combinations of bar height;

converting the said measured bar widths and spaces into a data character code by means of the said first conversion table;

converting the said measured bar heights into either a data character or a binary data stream by means of said second conversion table;

outputting the detected character codes to display means, or printing means or control means.

9. The method of claim 8 which further comprises the steps of;

locating the said bar code pattern in a bit map representation of a document image stored in the data processing system also being used for image storage and retrieval;

extracting the bar code portion of the document image for use as input to said bar code processing logic for interpretation of the said orthogonal bar code components;

outputting the said bar code reading results to the document image system software for use in identification of the document and such other purposes for which this code may be employed.

10. Apparatus for performing the methods of claim 5, comprising;

a data input means, or a plurality of data input means which can produce a plurality of independent data streams consisting of alphanumeric codes or binary data;

means for converting the plurality of input data streams to a single bar code pattern in which all of the code components are orthogonal and non-interacting;

means for printing the bar code pattern onto a substrate.

11. Apparatus to perform the method of claim 8, comprising;

a scanning means for converting the optical pattern to a bit map image of the bar code pattern;

logic means for measuring the width and heights of the bit map representation all dark marks in the bar code pattern and logic means for measuring the spacing between the bit map representation of the dark marks;

logic means for comparison of the stream of said mark or bar widths and space widths with acceptable known patterns for supported bar codes;

storing the results of successful comparisons in an output buffer means;

means for converting the height of the said code bars to logical binary values wherein the tall bars are designated binary ones, and the short bars are designated binary zeros;

means for comparing the digital outputs of the aforesaid conversion to acceptable code patterns to derive character based outputs if used;

means for producing a binary data stream output if character data is not used;

means for outputting stored data from both code components to display means, printing means, or control means.

12. Apparatus of claim 11 for the reading of the said combined bar code comprising the steps of;

routing the scanned image data through existing technology for reading the horizontal component of the said combined bar code;

routing the same scanned image data through existing technology for reading the vertical component of the said combined bar code;

outputting the results of the two readings as separate data streams.

* * * * *